United States Patent Office 3,439,803
Patented Apr. 22, 1969

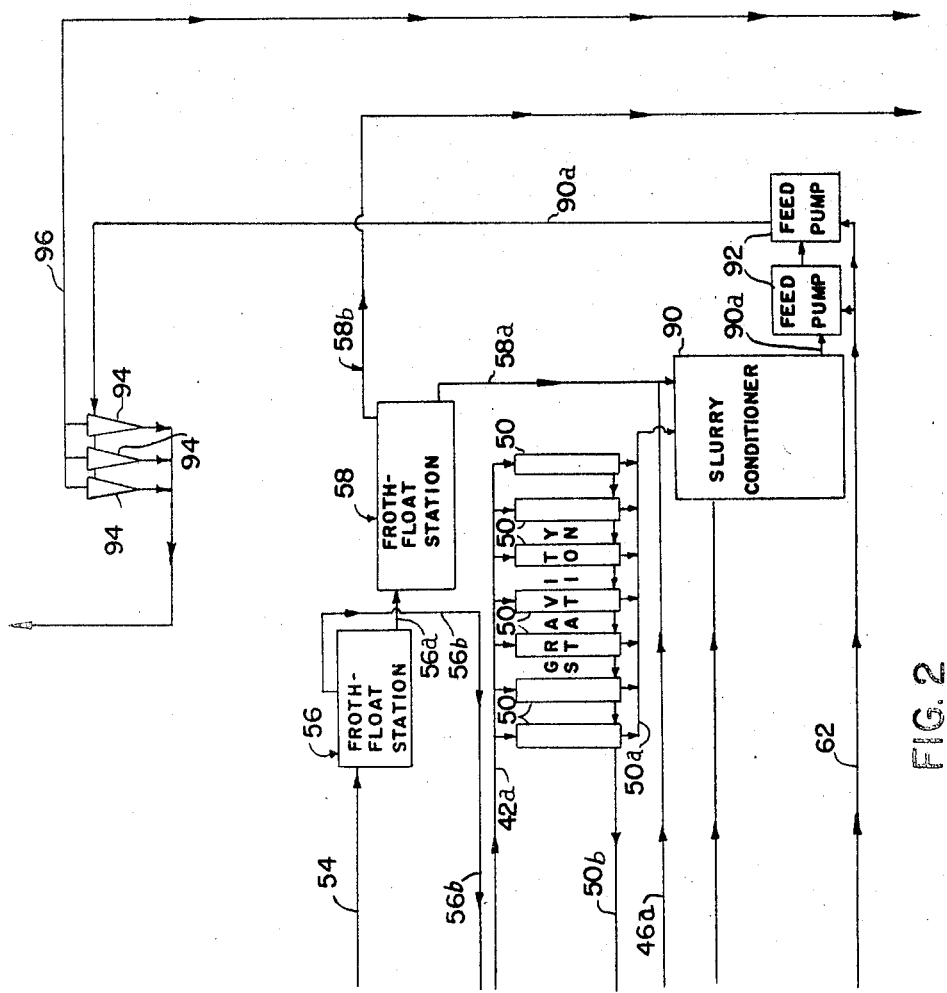

3,439,803
METHOD OF SALVAGING IRON FROM RIVERBEDS
Leonard A. Duval, 207 Harmon Road, Aurora, Ohio 44202
Filed Dec. 21, 1964, Ser. No. 419,883
Int. Cl. B03b 7/00; B03c 1/30; B03d 1/02
U.S. Cl. 209—12                                 7 Claims

ABSTRACT OF THE DISCLOSURE

The present invention relates to an iron recovery plant for removing iron from slime. The slime enters the plant and is roughly screened to remove large non-iron producing debris which are then discharged. The slime is then passed through magnetic separation stations which act in series to collect the course category iron particles and some of the intermediate category particles. The remaining tail is then passed into a gravity separation station operable to collect most of the intermediate particles. The tails from the gravity separation station may then be operated upon by froth-flotation and techniques to recover fine category particles remaining in the tails solution.

---

Figure 1:
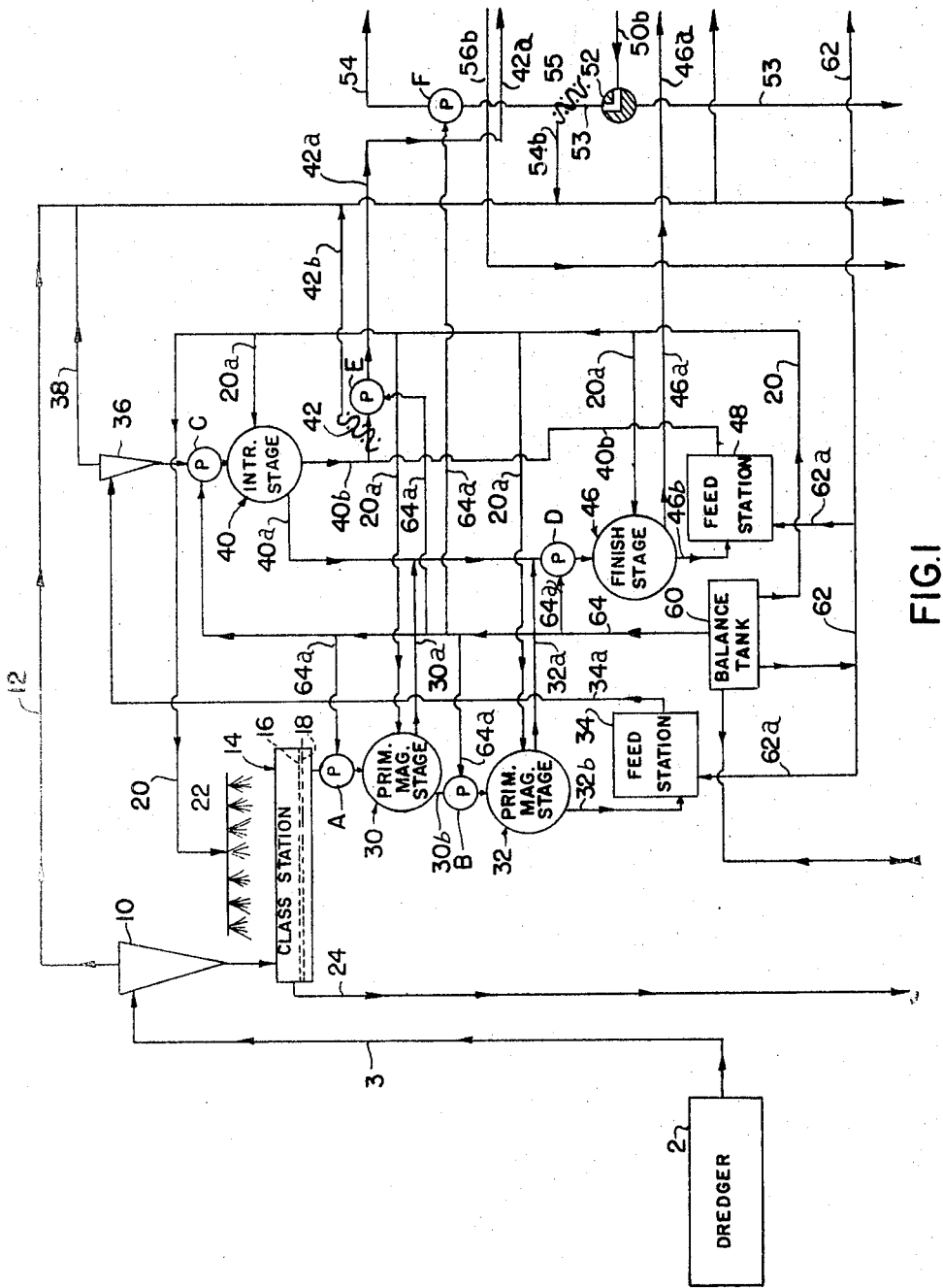

The invention relates to a mineral dressing operation and in particular to a process and apparatus for recovering a selected mineral.

Problems arise in mineral dressing operations when it is desirable or necessary to handle a large bulk of material to recover a selected mineral. Various mineral separating techniques such as gravity separation which are adapted to recover a large proportion of the selected mineral are not fast recovery operations and the handling of a large volume requires extensive apparatus even to the extent that it may become impractical to effect efficient separation. Consequently, other mineral separating techniques have been developed which are capable of rapidly handling a large bulk of material. One such technique is the magnetic drum technique where the material to be separated is magnetically classifiable. I have found, however, that in certain operations the magnetic technique recovers only a small portion of the available mineral. I have further discovered, however, that the magnetic drum technique will recover a large proportion of the magnetically separable mineral in particles above a predetermined size and that a highly efficient recovery operation with a minimum of apparatus can be obtained by using successive stages of magnetic separation to separate particles above a predetermined size and then to classify the tails produced by the magnetic separation process to eliminate all remaining particles above the predetermined size and to pass the classified tails to a gravity or gravity and froth-flotation systems to recover the remaining particles. While the separation process is suitable for use with various materials which include a selected mineral to be recovered that can be separated magnetically, the present invention is particularly useful in recovering iron from river-bottom slime.

A valuable supply of iron exists in the riverbeds adjacent most basic industrial plants particularly iron and steel making plants. The iron is discharged from the plants in waste material from the various manufacturing operations. The most prevalent forms of iron bearing waste material are scale discharged from such plants as the rolling mill, billet mill and blooming mill and dust emission from the blast furnace, sinter plant, open hearth and the oxygen steel making process. The iron dust is discharged in the atmosphere and settles to the river bottom while the scale is generally discharged directly into the river and settles to the bottom and forms a layer of slime. The problem heretofore encountered in recovering this iron has been to devise an economical system for recovering same. The present invention has solved this long-standing problem by use of a novel recovery plant which is located on a barge or the like so that the plant can be near the source of the iron rich slime.

I have discovered that the recoverable iron in the slime exists in particles of three general size categories and will be herein defined for illustration purposes as coarse, intermediate, and fine. The so-called coarse category includes particles generally above 20 mesh; the so-called intermediate category includes particles generally above 48 mesh and below 20 mesh; and the so-called fine category includes particles generally below 48 mesh. It follows then that any process for the effective recovery of iron from the slime must provide for the recovery of the various size particles.

To this end I have further discovered that: magnetic separation is effective to recover a substantial portion of iron existing in particles of the so-called coarse category; gravity separation effectively recovers a substantial portion of the iron existing in particles of the so-called intermediate category; and froth-float separation effectively recovers a substantial portion of the iron existing in particles of the so-called fine caegory. This is not to imply that the magnetic and gravity separation process will not separate iron particles in the intermediate and fine categories. What is meant is that the coarse particles remaining in the magnetically separated tails contain very small amounts of iron and that particles of this category can be discharged from the system to thereby reduce the volume of material delivered to the gravity separator. The same is true with respect to the gravity separation system, i.e., the particles of the intermediate category remaining after the gravity separation can be discharged from the system at this point since there is insufficient iron remaining therein to warrant any further processing thereof.

Utilizing these principles the present invention consists of an iron recovery plant wherein the slime first undergoes a screening or rough classification so as to remove foreign debris and other large particles which contain very little, if any, iron and to discharge them from the system. The acceptable size particles are conveyed to a magnetic separation station wherein substantially all of the iron particles of the coarse category are recovered as well as some of the intermediate and fine category particles in the form of concentrate and the remainder of the slime is separated as tails and conveyed to a second classification station. This station removes and discharges all particles of the coarse category thereby reducing the total bulk and conveys the remaining magnetically produced tails which now consists of particles of the intermediate and fine categories to a gravity separation station. The gravity separation station separates substantially all iron bearing particles of the intermediate category as well as some particles of the fine category from the non-iron bearing particles; the former are collected as concentrate while the latter are conveyed to a third classification station. This station removes and discharges the remaining particles falling within the intermediate category thereby further reducing the bulk and conveys particles of the fine category to the froth-float separation station. As stated previously, this station then separates the iron bearing particles of the fine category into iron concentrate and tails and the tails is at this point discharged from the plant while the concentrate is collected with the concentrate produced by the magnetic and gravity separation stations.

A recovery plant employing the process just described effectively removes the iron from the slime at a great rate while maintaining the bulk processed by the system to a practical minimum.

The plant embodying the present invention will be further understood by reference to the specifications and accompanying drawings in which FIGS. 1 and 2 together disclose a schematic flow diagram of the iron recovery plant of the present invention.

The iron recovery plant of the present invention comprises six basic work stations. The stations include, in their order of processing the slime; a wash and classification station, a magnetic separation station, a second classification station, a gravity separation station, a third classification station, and a froth-float separation station. The separation stations utilize different principles of separation and when arranged in the order set forth herein cooperate to recover the iron in the form of concentrate from the slime at the greatest rate while recovering the major part of the iron present in the slime.

A dredging apparatus as shown schematically on FIG. 1 by reference numeral 2 functions to remove the slime from the river-bottom. This slime is conveyed to the recovery plant through a pipe 3. The dredging apparatus is mounted on a barge or the like as is the recovery plant. These units are moved down the river together as the slime is progressively dredged from the river-bottom. The pipe 3 discharges the material into a dewatering cone 10 which operates on the centrifugal principal in a well known manner to remove a predetermined amount of water from the slime preparatory to classification by the classification station. The water removed by the dewatering cone 10 is discharged through pipe 12. The wash and classification station 14 includes a table having in the particular embodiment shown two screens 16, 18 of different mesh disposed above one another. Material delivered to the table is thus classified in two stages as to size, the material undergoing a rough classification by screen 16, the acceptable size particles pass through screen 16 and then undergo a final size classification by screen 18. Any well known type of apparatus, such as a vibrator or a dragging apparatus, can be used to assist in moving the material through the various screens. This classification station is effective to separate debris and other large non-iron bearing particles from the slime preparatory to delivering the slime to the magnetic separation station. The slime passing through screen 18 is conveyed to pulping station A. As the material is being classified by the table it is washed by a suitable spray mechanism 22 which is supplied with water from balance tank 60 through line 20. The unacceptable size material is discharged from station 14 through line 24.

The function of the pulping station A is to bring the solid-liquid ratio of the material to a preselected level prior to being introduced into the magnetic separation station and thereafter pump the material to the station. The desired solid-liquid ratio is achieved by the pulping station by either adding or removing liquid from the material. A pump thereafter conveys the material to the magnetic separation station at a preselected rate of feed according to the capacity of the corresponding separator which is to receive the slime.

To provide for an effective magnetic separation of the iron bearing particles in the slime falling within a coarse category, three magnetic separation stages are employed. They include a primary magnetic separation stage consisting of separators 30 and 32, an intermediate magnetic separation stage 40 and a finish magnetic separation stage 46. The primary separation stages comprise two wet magnetic drum-type separators each separator having an inlet, a rotating magnetic drum positioned adjacent the inlet and disposed in the path of the material to be separated and concentrate and tails outlets which are arranged relative to the drum so as to receive the magnetic concentrate separated by the drum and the tails which was not collected on the face of the drum, respectively. The concentrate is discharged from the concentrate outlet through line 30a while the tails is discharged through line 30b to pulping station B. The pulping station B functions in a manner similar to pulping station A by bringing the solid-liquid ratio of the tails produced by separator 30 to a predetermined level and then delivering same to the second magnetic separator 32. Separator 32 is similar in construction and operation to separator 30 except that its drum has a stronger magnetic field than does the drum of separator 30 and discharges concentrate produced thereby through line 32a and the tails produced thereby through the tails outlet into line 32b. The tails are conveyed through line 32b to a feed station 34. This latter station adds liquid to the tails to make it more effective for pumping through line 34a to the intermediate separation stage 40 by a suitable pumping mechanism at station 34. Water is supplied to feed station 34 from balance tank 60 through line 62a. In the particular arrangement disclosed it is necessary to have the intermediate separation stage physically removed a considerable distance from separator 32 thereby necessitating a feed pump of larger capacity than those employed in the pulping station. However, it should be appreciated that if space permits, the intermediate separation stage could be located adjacent to the primary stage thereby eliminating the necessity for a larger capacity feed pump and the subsequent dewatering cone 36 which must remove the water added to the tails mixture by feed station 34 in order to pump the material the required distance. The dewatering cone 36 functions like cone 10 and removes a predetermined amount of water from the tails solution preparatory to introducing the magnetic tails into the intermediate separation stage. The water removed by cone 36 is discharged through line 38 into main discharge line 12. The intermediate separation stage includes a pulping station C and a wet magnetic separator 40 which is similar in construction and operation to separators 30 and 32 except that it has a stronger magnetic field than the previous separators. The material is conveyed from cone 36 to the pulping station C which station functions to bring the solid-liquid ratio of the tails mixture to a predetermined level and then feed the mixture to the inlet of separation stage 40. The concentrate produced by the intermediate separation stage is discharged through a concentrate outlet into line 40a which conveys concentrate produced thereby to the finish separation stage. The concentrate lines 30a and 32a are connected to line 40a so that the concentrate produced by the primary and intermediate stages are combined and delivered to the pulping station D which functions as the previously described pulping stations to bring the solid-liquid ratio of the concentrate to a predetermined level and thereafter deliver it to the finish separation stage 46. The tails separated by separation stage 40 is discharged through the tails outlet into line 40b.

The finish separation area 46 comprises an inlet, a magnetic drum, a concentrate outlet, and a tails outlet similar to the previously described separators except that its magnetic field is stronger than the magnetic field of the previous separator. The final magnetic concentrate produced by separation stage 46 is discharged through the concentrate outlet and into line 46a to a concentrate storage station 90. The tails produced by the finishing separation stage 46 is discharged through the tails outlet and into line 46b to a feed pump 48. This feed pump functions like feed pump 34 by adding liquid to the tails so that they can be effectively conveyed to pipe 40b where the tails mix with tails produced by intermediate stage 40. The combined tails mixture in pipe 40b thus represents the total tails produced by the magnetic separation station. The iron remaining in this tails solution is in particles of the intermediate and fine categories. The remaining particles in the tails solution of the coarse category can now be discharged from the plant as they do not contain sufficient iron to warrant further separation. To separate these non-iron bearing coarse category particles, the tails mixture is delivered to a screen 42 which is a 20 mesh screen and passes the intermediate and fine category tails mixture to pulping station E while discharging the coarse category particles from the plant through line 42b which conveys the material into discharge pipe 12. The bulk thus delivered to pulping station E is in the intermediate and fine categories. Pulping station E functions like the previously described pulping stations and prepares the intermediate and fine particles for separation by the gravity separation station.

The magnetic drums of the magnetic separation stages 30, 32, 40, and 46 are supplied with water from balance tank 60 through line 20 and branch lines 20a. The water is used in the magnetic separation process to wash magnetic concentrate from the drums in accordance with well known practice. The water and magnetic concentrate are discharged from the magnetic drums through lines 30a, 32a, 40a and 46a. The pulping stations are supplied with a source of water from balance tank 60 through line 64 and branch lines 64a. The feed pumps 34 and 48 are supplied with water from balance tank 60 through main line 62 and branch lines 62a.

The magnetically separated tails of the intermediate and fine categories are delivered to the gravity separation station through line 42a. The gravity separation station includes in the preferred embodiment a plurality of juxtaposed gravity spirals 50 which separate the magnetically produced tails into a concentrate and tails according to the relative specific densities of the tails delivered thereto. The inlet portion of each of the gravity spirals 50 is higher in elevation than the outlets thereof and the tails produced by the gravity separation is discharged through the tails outlet into line 50b. The concentrate is discharged from each of the gravity spirals 50 through their respective concentrate outlets into line 50a for conveyance to the concentrate storage station 90. The gravity separation station effectively removes substantially all the iron particles in the intermediate size category from the magnetically produced tails and hence the iron remaining after the gravity separation are in the fine particle size category. As stated previously, the slime contains iron in the form of scale and dust and the relative proportions of each is determined by the continuous sampling of the river-bottom slime as the dredger progresses along the riverbed. The different ratios of scale to dust is determined by what part of the river is being dredged, i.e., if it lies adjacent to or closer to a rolling mill, billet mill, and blooming mill there will be more scale than dust. However, if dredging from a portion of the stream closer to the blast furnace, sinter plant, open hearth, or oxygen steel making process there will be more dust. The samples which show the scale-dust ratio are used to determine whether the tails produced by the gravity separation station contain sufficient dust which would be of the fine particle category to merit froth-float separation. If there is insufficient iron bearing particles of the fine category then the tails discharged through line 50b are delivered to valve 52 which, in this case would be oriented 90° from that shown on the drawing to discharge the tails from the plant through line 53. If on the other hand the sample shows that there is sufficient iron dust of the fine category then the valve is positioned as shown in FIG. 1 and delivers the tails to the classification station 55. Separation station 55 includes a 48 mesh screen which functions to discharge the remaining intermediate particles from the plant through lines 54b and 12 thereby reducing the bulk and passing only the fine category particles in which the iron therein can be effectively recovered by the froth-float process. The fine category particles, after passing through classification station 55 and delivered to pulping station F which functions like the previously described pulping station to bring the solid-liquid ratio of the fine particles to a predetermined level, thereafter conveys same to the froth-float separation station.

Material from pulping station F is conveyed through line 54 to the first of a plurality of froth-float cells, each designed to float out a predetermined element from the mixture. The element which is to be removed from the tails would depend of course on the ultimate desired material which the plant is designed to produce. In the case of iron the first cell 56 is designed to remove carbon and the second cell 58 to remove silica. The cells 56 and 58 are of similar construction and function in a similar manner and are well known in the art. Suffice it to say that each cell consists of a reservoir into which the gravity separated tails are discharged and a gas is introduced generally in the bottom of the reservoir and is agitated and rises through the solution to the surface. According to the particular reagent added to the bath, certain particles of the tails mixture will adhere to the bubbles and are carried through the bath by the bubbles to the surface where they are removed by a scraper. The elements which do not adhere to the bubbles settle to the bottom and are discharged therefrom. Generally, the element floated out is one of least quantity in the mixture so that the major portion of the mixture will settle to the bottom of the reservoir. As previously stated in the case of iron separation the bubbles in cell 56 are arranged to float out and thereby separate carbon as tails and are discharged through the tails outlet of cell 56 through line 56b. The iron concentrate produced by the cell 56 is conveyed to cell 58 through line 56a wherein the silica is separated from the concentrate as tails and discharged through the tails outlet of cell 58 into line 58b. The carbon and silica separations are achieved by conventional froth-flotation procedures and disclosure of the specific details of their separations are unnecessary for an understanding of the present invention. The final concentrate produced by the froth-float separation station is discharged through the concentrate outlet of cell 58 into line 58a to the concentrate storage station 90.

The concentrate storage station 90 can be either a stock pile for the mineral concentrate produced by the recovery plant or in the event it is desired to have the ultimate storage of the concentrate at a point remote from the plant, then a slurry conditioner will be employed to make a slurry out of the concentrate and discharge it through line 90a to feed pumps 92 which function in a manner similar to feed pumps 40 and 48 to bring the slurry to a solid-liquid ratio for efficient pumping through line 90a to the remote storage area. Because liquid has been added to the concentrate for pumping purposes it is necessary to provide a plurality of dewatering cones 94 at the remote storage location to remove the excess water from the concentrate prior to final storage thereof. Water is supplied to the feed pumps 92 from balance tank 60 through line 62. The excess water removed from the concentrate by the dewatering cones 94 is discharged through line 96.

The actual details of construction of the various separators, pumps, pulping stations, dewatering cones, etc. have not been illustrated because they are all well known in the art, per se and are available commercially. Equipment of the type referred to in the specification is disclosed in considerable detail in several handbooks and, for example, in the handbook entitled, "Extractive Metallurgy" written by Newton and published in 1959. In view of the fact that the independent elements are well known, per se and are available commercially, disclosure of the specific details of this equipment is unnecessary for an understanding of the present invention.

Although the recovery plant has been particularly described in reference to an iron recovery plant it should be appreciated that the plant, by suitable adjustments in the various equipment, could be adapted for separating a wide range of minerals which are capable of magnetic

I claim:
1. A process for recovering a preselected mineral in the form of mineral concentrate from a heads mixture including magnetic and non-magnetic particles which are of different size and specific gravity comprising:
   (a) separating the heads magnetically by processing same through a primary, intermediate and finishing stages and wherein each stage produces concentrate and tails, the tails produced by the primary stage is conveyed to the intermediate stage while the concentrate produced by the primary and intermediate stages is conveyed to the finishing stage;
   (b) conveying the concentrate produced by the finishing stage to a concentrate storage means;
   (c) classifying the magnetic tails produced by the intermediate and finishing stages by size and discharging the unacceptable size tails;
   (d) separating by gravity the acceptable size magnetic tails into concentrate and tails and conveying the concentrate to said concentrate storage station.

2. A process for recovering a preselected mineral in the form of mineral concentrate from a heads mixture including magnetic and non-magnetic particles which are of different size and specific gravity comprising:
   (a) separating the acceptable size portions of the heads magnetically into concentrate and tails by processing the heads through a primary magnetic separation stage, an intermediate magnetic separation stage and a finishing magnetic separation stage, and wherein the magnetic field of each stage is progressively stronger;
   (b) conveying the concentrate produced by the primary and intermediate stages to the finishing stage;
   (c) conveying the tails produced by the primary stages to the intermediate stage and the tails produced by the intermediate and finishing stages to a classification station;
   (d) classifying the magnetic tails according to size and discharging the unacceptable size portion of the heads;
   (e) separating by gravity the acceptable size tails into concentrate and tails;
   (f) conveying the concentrate produced by the magnetic finishing stage and the gravity separation means to a concentrate storage means.

3. The process for recovering a mineral in the form of concentrate from a heads mixture including magnetic and non-magnetic particles which are of different size and specific gravity comprising:
   (a) separating the heads magnetically by processing same through primary, intermediate, and finishing separation stages having magnetic fields of progressively increasing strength and wherein each stage produces concentrate and tails, the tails produced by the primary stage is conveyed to the intermediate stage while the concentrate produced by the primary and intermediate stages is conveyed to the finishing stage;
   (b) conveying the concentrate produced by the finish stage to a concentrate storage means;
   (c) classifying the magnetically separated tails produced by the intermediate and finishing stages according to size and discharging the unacceptable size particles and conveying the acceptable size particles to the gravity separation means;
   (d) separating by gravity the tails conveyed thereto into concentrate and tails and conveying the concentrate to said concentrate storage station;
   (e) classifying the gravity separated tails according to size and discharging the unacceptable size particles while conveying the acceptable size particles to a froth-float separation means;
   (f) separating by the froth-float process the tails delivered thereto into concentrate and tails and conveying the concentrate produced thereby into said concentrate storage station.

4. A process for recovering a preselected mineral in the form of mineral concentrate from a heads mixture including magnetic and non-magnetic particles which are of different size and specific gravity comprising:
   (a) classifying the heads according to size and discharging the unacceptable size portion of the heads;
   (b) separating magnetically the acceptable portion of the heads into concentrate and tails by processing the heads through a primary magnetic separation stage, an intermediate magnetic separation stage and a finishing magnetic separation stage;
   (c) conveying the concentrate produced by the primary and intermediate stages to the finishing stage;
   (d) conveying the tails produced by the primary stage to the intermediate stage and the tails produced by the intermediate and finishing stages to a classification station;
   (e) classifying by size the tails produced by the intermediate and finishing stages and discharging the unacceptable size particles thereof;
   (f) separating by gravity the acceptable size tails into concentrate and tails;
   (g) conveying the concentrate produced by the magnetic finishing stage and the gravity separation means to a concentrate storage means;
   (h) classifying by size the tails produced by the gravity separation system and conveying the acceptable size tails to a froth-float separation means;
   (i) separating the acceptable size tails into concentrate and tails and conveying the concentrate to said concentrate storage means.

5. A process for recovering iron in the form of concentrate from a heads mixture including magnetic and non-magnetic particles which are of different size and specific gravity comprising:
   (a) separating the acceptable portions of the heads magnetically into concentrate and tails by processing the heads through a primary magnetic separation stage, an intermediate magnetic separation stage and a finishing magnetic separation stage;
   (b) conveying the concentrate produced by the primary and intermediate stages to the finishing stage;
   (c) conveying the tails produced by the primary stage to the intermediate stage and the tails produced by the intermediate and finishing stages to a classification station;
   (d) classifying the magnetic tails according to size and discharging the unacceptable size portion of the heads;
   (e) separating by gravity the acceptable size magnetic tails into concentrate and tails;
   (f) separating by froth-floatation the gravity separated tails into concentrate and carbon tails and further separating this concentrate by froth-floatation into a finished concentrate and silica tails;
   (g) conveying the magnetically separated concentrate, the gravity separated concentrate and the finished concentrate produced by the froth-float separation to a storage area.

6. An apparatus for separating a mineral from a material including the mineral and other material comprising:
   (a) a magnetic separation station defining a primary separation area, an intermediate separation area and a finishing separation area, each area including an inlet and magnetic separator means disposed adjacent to the inlet and adapted to separate magnetically material delivered to said inlet into concentrate and tails and concentrate and tails outlets disposed relative to the magnetic separation means and adapted to receive and deliver the separated concentrate and tails, respectively, the magnetic fields of said separator means for said areas being progressively stronger;
(b) a gravity separation station including an inlet, a plurality of gravity spirals arranged adjacent said inlet to separate by gravity material delivered to said inlet into concentrate and tails and concentrate and tails outlets disposed relative to said gravity spirals and adapted to receive the separated concentrate and tails, respectively;
(c) a concentrate storage means;
(d) a classification station including means to classify material by size and discharge the unacceptable size material;
(e) means for conveying material to be separated to said inlet of said primary separation area of said magnetic separation station;
(f) means for conveying the tails from said tails outlet of said primary separation area to said inlet of said intermediate separation area and from said tails outlets of said intermediate and finishing separation areas to said classification station;
(g) means associated with said classification station and inlet of said gravity separation station to convey the acceptable size magnetic tails to said inlet of said gravity separation station;
(h) means for conveying the concentrate from said concentrate outlets of said primary and intermediate areas to said inlet of said finishing separation area;
(i) and means associated with said concentrate outlets of said finishing separation area and said gravity separation station to convey the concentrate produced thereby to said concentrate storage means.

7. An apparatus for separating a mineral from a material including iron as well as other material comprising:
(a) a magnetic separation station defining a primary separation area, an intermediate separation area and a finishing separation area, each area including an inlet and magnetic separator means disposed adjacent to the inlet and adapted to separate magnetically material delivered to the inlet into concentrate and tails and concentrate and tails outlets disposed relative to the magnetic separation means of the area and adapted to receive and deliver the separated concentrate and tails respectively, the magnetic fields of said areas being progressively stronger;
(b) a gravity separation station including an inlet, a plurality of gravity spirals arranged adjacent said inlet to separate by gravity material delivered to said inlet into concentrate and tails, and concentrate and tails outlets disposed relative to said gravity spirals and adapted to receive the separated concentrate and tails, respectively;
(c) a froth-float separation station including a plurality of froth-float cell means, each of said cell means having an inlet and a froth-float cell arranged relative to the inlet to separate the material delivered to the inlet into concentrate and tails, and concentrate and tails outlets arranged relative to the cell to receive and deliver the separated concentrate and tails, respectively, one of said cells separating carbon from the gravity separated tails while another of said cells separating silica from the concentrate separated by said one cell;
(d) a concentrate storage means;
(e) a classification station including means to classify material by size and discharge the unacceptable size material;
(f) means for conveying material to be separated to said inlet of said primary separation area of said magnetic separation station;
(g) means for conveying the tails from said tails outlet of said primary separation area to said inlet of said intermediate separation area and from said tails outlets of said intermediate and finishing separation areas to said classification station;
(h) means associated with said classification station and inlet of said gravity separation station to convey the acceptable size magnetic tails to said inlet of said gravity separation station;
(i) means for conveying the concentrate from said concentrate outlets of said primary and intermediate areas to said inlet of said finishing separation areas;
(j) means for conveying the gravity separated tails from said tails outlet of said gravity separation station to the inlet for said one of said froth-float cells;
(k) means for conveying the concentrate separated by said one of said froth-float cells from the concentrate outlet thereof to the inlet of said another of said froth-float cells;
(l) means for discharging the carbon tails and silica tails from said tails outlets of said one and another cells, respectively;
(m) means associated with said concentrate outlets of said finishing separation area, gravity separation station and said another froth-float cell to convey the concentrate produced thereby to said concentrate storage means.

References Cited

UNITED STATES PATENTS

| | | | |
|---|---|---|---|
| 402,904 | 5/1899 | Conkling | 209—214 X |
| 1,295,857 | 3/1919 | Craft | 209—214 |
| 1,576,690 | 3/1926 | Ullrich | 209—214 |
| 2,269,912 | 1/1942 | Ladoo | 209—38 X |
| 2,340,523 | 2/1944 | Ferris | 209—166 |
| 2,428,228 | 9/1947 | Keck | 209—214 X |
| 2,431,559 | 11/1947 | Humphreys | 209—459 X |
| 2,500,154 | 3/1950 | Crockett | 209—12 X |
| 2,890,795 | 6/1959 | Dering | 209—166 X |

OTHER REFERENCES

Taggart: Handbook of Mineral Dressing, N.Y., John Wiley & Sons, 1945, sec. 11, p. 01, TN500T3.

FRANK W. LUTTER, *Primary Examiner.*

U.S. Cl. C.X.
209—214